United States Patent [19]
Johnston

[11] Patent Number: 6,017,181
[45] Date of Patent: Jan. 25, 2000

[54] CASK TRANSPORTER

[75] Inventor: Roger L. Johnston, Muskego, Wis.

[73] Assignee: J&R Engineering Co., Inc., Mukwonago, Wis.

[21] Appl. No.: 08/250,378

[22] Filed: May 27, 1994

[51] Int. Cl.$^7$ ..................................................... B60P 3/00
[52] U.S. Cl. ......................... 414/459; 414/460; 414/911
[58] Field of Search .................................. 414/146, 429, 414/458–9, 460–1, 561, 911; 187/223, 362, 368–9

[56] References Cited

U.S. PATENT DOCUMENTS

| | | | |
|---|---|---|---|
| 2,775,357 | 12/1956 | Arment | 414/458 |
| 3,398,492 | 8/1968 | Nansel . | |
| 3,494,492 | 2/1970 | Thiermann | 414/461 |
| 3,543,884 | 12/1970 | Riedner | 187/369 |
| 3,841,494 | 10/1974 | Chalupsky et al. . | |
| 4,020,960 | 5/1977 | Louis et al. | 414/458 |
| 4,036,372 | 7/1977 | Rao et al. . | |
| 4,055,508 | 10/1977 | Yoli et al. | 414/146 X |
| 4,269,560 | 5/1981 | Thomas | 414/459 |
| 4,350,255 | 9/1982 | Blase et al. . | |
| 4,381,839 | 5/1983 | Engler et al. . | |
| 4,433,952 | 2/1984 | Glickman | 414/460 |
| 4,551,059 | 11/1985 | Petoia | 414/459 |
| 4,573,853 | 3/1986 | Lorenz . | |
| 4,683,969 | 8/1987 | Littau | 414/460 X |
| 4,725,185 | 2/1988 | Neagu | 187/369 X |

FOREIGN PATENT DOCUMENTS

| | | |
|---|---|---|
| 2476727 | 8/1981 | France . |
| 2247491 | 4/1974 | Germany . |
| 2439667 | 3/1976 | Germany . |
| 688419 | 10/1979 | U.S.S.R. . |
| 992397 | 2/1983 | U.S.S.R. . |

*Primary Examiner*—James W. Keenan
*Attorney, Agent, or Firm*—Nilles & Nilles

[57] ABSTRACT

A cask transporter for engaging, lifting and safely transporting casks containing nuclear waste material. The cask transporter comprises a gantry structure including a plurality of extendible telescoping boom assemblies coupled to a beam. A platform is coupled to and supports the gantry structure and couples the gantry structure to a driven tread mechanism. Couplers couple the beam to a cask to be transported, and cushioned restraints restrain a cask from colliding with the cask transporter.

10 Claims, 2 Drawing Sheets

CASK TRANSPORTER

BACKGROUND OF THE INVENTION

This invention relates generally to mobile lifting equipment and, more particularly, to a mobile gantry for transporting casks for nuclear power facilities.

Safe storage of spent fuel rods for nuclear power facilities is a problem of increasing magnitude. In the past, spent fuel rods were typically housed in storage facilities which carefully controlled the storage environment. Steadily increasing volumes of this radioactive waste have led to a search for more cost effective storage alternatives. A leading alternative is a system using specially designed storage casks to house significant amounts of radioactive waste. These containers are designed to withstand the elements, and can therefore be stored outside without requiring the precise control systems of expensive storage facilities.

While the cask storage system has significant benefits, this approach has led to a need for a reliable vehicle design capable of transporting casks weighing up to 135 tons. Substantial lifting capacity is not the only feature of an ideal cask transporter. A compact design which does not damage nuclear power facility floors while safely transporting heavy casks is also desirable.

In view of the foregoing, it is a general object of the present invention to provide a new and improved vehicle for transporting casks for nuclear power facilities.

It is a further object of the present invention to provide a new and improved mobile gantry for transporting casks that is compact and does not damage nuclear power facility floors.

It is a further object of the present invention to provide a new and improved cask transporter capable of safe and smooth traverse of uneven ground.

SUMMARY OF THE INVENTION

The invention provides a mobile gantry for transporting casks for nuclear power facilities. The gantry comprises telescoping boom assemblies coupled to a beam. Coupling devices connect the beam to the cask for transport. The gantry is connected to a platform which carries an engine and a control console. The engine powers a hydraulic pump which provides pressurized hydraulic fluid to hydraulic motors and to hydraulic cylinders which extend the boom assemblies. The hydraulic motors are coupled to tread mechanisms. The tread mechanisms greatly reduce the floor loading concentrations and allow the vehicle to traverse uneven ground smoothly. A restraining mechanism is provided which prevents uncontrolled swinging of the cask. A cam-locking mechanism prevents unexpected retraction of the boom assemblies, increasing the safety of the design.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
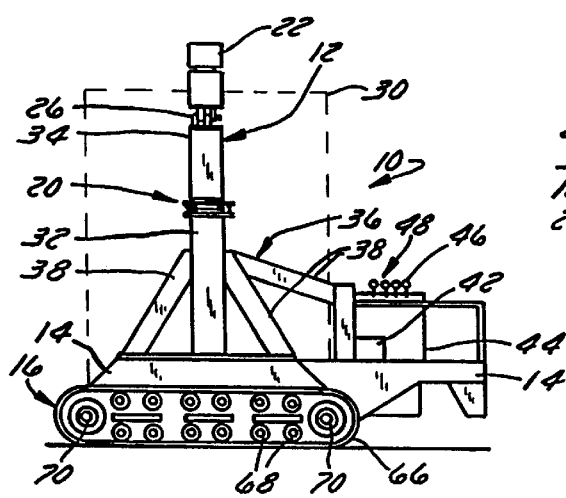
FIG. 1 is a front view of the cask transporter system embodying various features of the invention.

Referring to the figures, and, in particular, to FIG. 1, a cask transporter system 10 includes a gantry 12, a platform 14 and two tread mechanisms 16. The cask transporter system 10 generally comprises a self-propelled vehicle that lifts, transports and positions radioactive waste storage casks. The gantry 12 is connected to the platform 14, which is connected to the tread mechanisms 16. The tread mechanisms 16 are spaced apart by the platform 14 and the gantry 12 and are driven by conventional hydraulic motors 18.

The gantry 12 includes two extendible boom assemblies 20, a beam 22 and a restraining system 24. The beam 22 is connected by pin joints 26 at the tops of the boom assemblies 20 to allow for slight variance in the extension of the two boom assemblies 20. The joint pins 26 provide excellent lateral stiffness while allowing extension discrepancies to take place without fatigue or failure of the beam 22.

Figure 2:
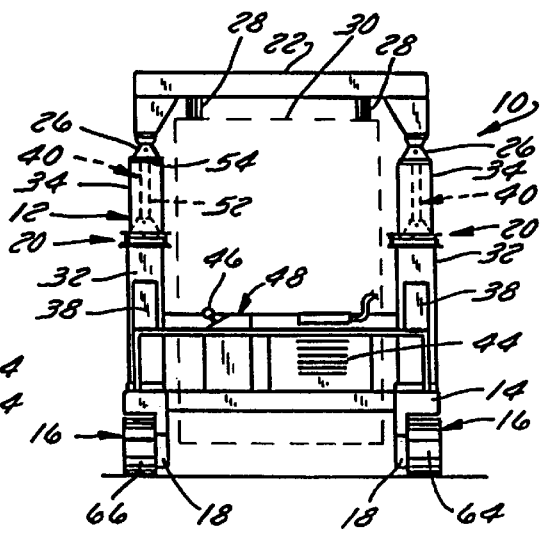
FIG. 2 is a side view of the cask transporter shown in FIG. 1.

Conventional couplers 28 such as chains, cables or other conventional rigging equipment, are used to connect a cask 30 to the beam 22 for transporting as shown in FIG. 2. The cask 30 is coupled to the beam 22 when the boom assemblies 20 are fully retracted. The boom assemblies 20 must then be extended to lift the cask 30 off the ground with the beam 22 and the couplers 28.

Figure 3:
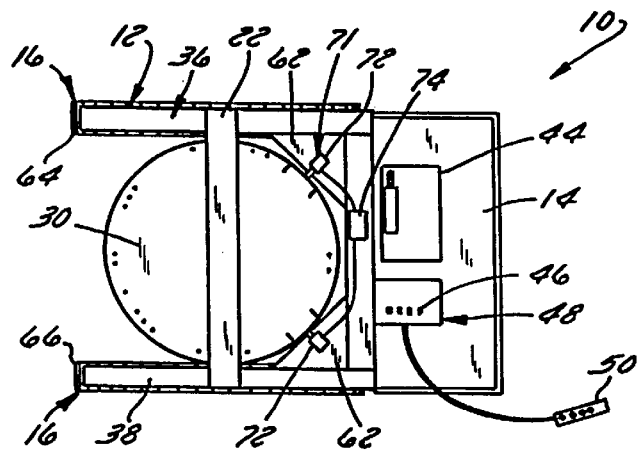
FIG. 3 is a top view of the cask transporter shown in FIG. 2.

The boom assemblies 20 each comprise an outer support section 32 and an inner telescoping section 34 slidably received within the outer support section 32. The outer support section 32 is securely connected to the platform 14 by support structures 36. It will be apparent to one of ordinary skill in the art that a wide variety of support structures can be used equivalently to support the extendable boom assemblies 20. However, angled structures 38 connected to the platform 14 as shown in FIGS. 1 and 3 are preferably used.

A hydraulic cylinder 40 is connected to the outer support section 32 and is disposed within the inner telescoping section 34 of each boom assembly 20. The hydraulic cylinder 40 is supplied with pressurized hydraulic fluid by a hydraulic pump 42 driven by a propane engine 44 mounted on the platform 14. The flow of the pressurized hydraulic fluid is controlled by a conventional valve 46 mounted in the control console 48. The valve 46 can be controlled from the control console 48 or from an auxiliary pendant control 50 which enables remote operation of the system 10. All of the hydraulic components are coupled by a conventional hydraulic system in a manner which will be apparent to one of ordinary skill in the art.

Figure 4A:
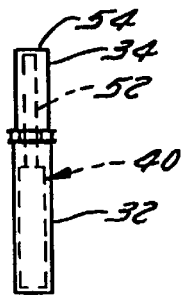
FIG. 4A is a front sectional view of the boom assembly with a lift cylinder in an upright orientation.
Figure 4B:
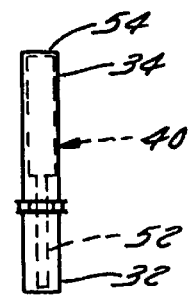
FIG. 4B is a front sectional view of the boom assembly with a lift cylinder in an inverted orientation.

The inner telescoping section 34 in each boom assembly 20 is extended under power from the hydraulic cylinder 40 when the pressurized fluid is directed through the valve 46 to the hydraulic cylinder 40. The ram 52 of the hydraulic cylinder 40 extends upward (in the upright configuration shown in FIG. 4A) to contact the upper plate 54 of the inner telescoping section 34, thereby extending the inner telescoping section 34 as well. The hydraulic cylinder 40 can also be mounted in an inverted position as shown in FIG. 4B.

Because the outer support section 32 is securely connected to the platform 14 and the tread mechanism 16, and because the boom assemblies 20 are connected to the beam 22, the beam 22 extends upward coordinately with the boom assemblies 20. The connection between the cask 30 and the beam 22 using the couplers 28 lifts the cask 30 coordinately with the beam 22. In this way, the cask 30 is raised to a transport position. If additional lifting height is desired, multiple stage boom assemblies, such as the assemblies shown in U.S. patent application Ser. No. 07/971,333, filed Nov. 4, 1992 (and assigned to the assignee of the present application), can be used.

Figure 5A:
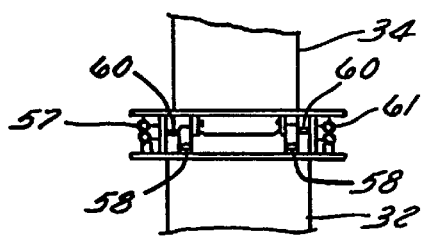
FIG. 5A is a detailed side view of a cam locking mechanism shown in FIGS. 1 and 2.
Figure 5B:
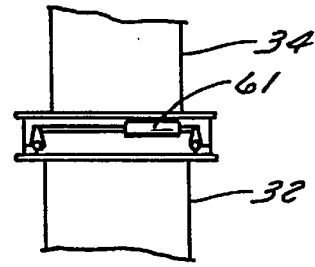
FIG. 5B is a detailed front view of the cam locking mechanism shown in FIGS. 1, 2 and 5A.
Figure 6:
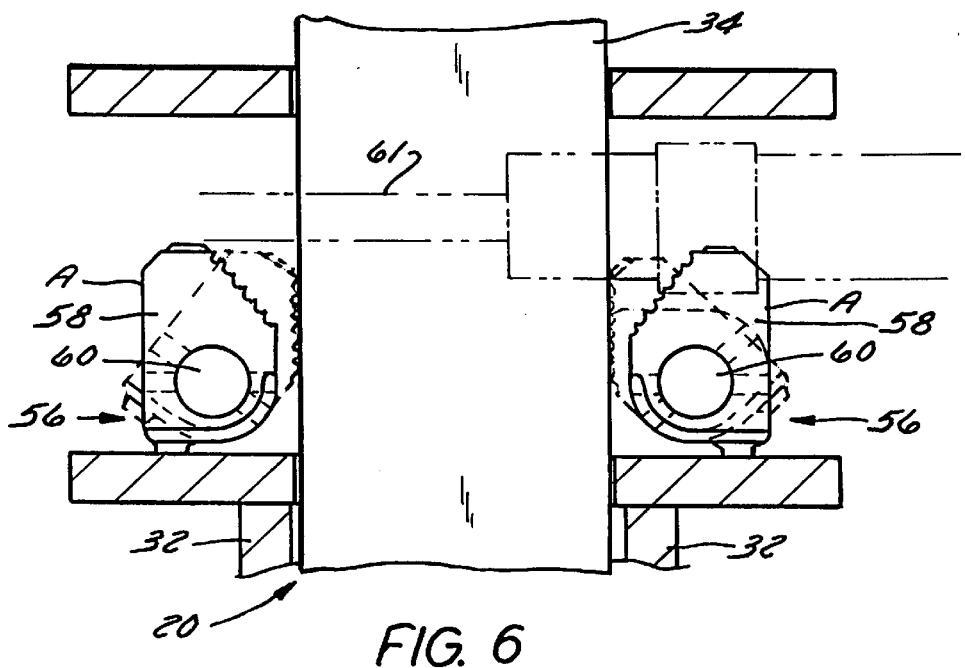
FIG. 6 is a front view of a cam engaging a boom assembly.

In order to improve the security of a raised cask 30, the boom assemblies 20 are provided with cam-locking mechanisms 56 shown in FIGS. 5 and 6. Each cam-locking mechanism 56 comprises a toothed cam 58 as shown in FIG. 6. The cam-locking mechanism 56 is mounted on a support 60 that allows rotation of the cam-locking mechanism 56 about the support 60. It will be apparent to one of ordinary skill in the art that a wide variety of mounting techniques for the cam-locking mechanism 56 can be used, provided the technique enables frictional engagement of the toothed cam 58 with the inner telescoping section 34 of the boom assembly 20. The cam-locking mechanism 56 is retained in its disengaged position A by hydraulic pressure. When the hydraulic pressure drops to a level where the hydraulic cylinder 40 might begin to retract unexpectedly, the cam-locking mechanism 56 rotates under pressure from spring 57 to engage the boom assembly 20 to which it is mounted. This engagement prevents retraction of the hydraulic cylinder 40, thus preventing unexpected lowering of the cask 30. The unlocking cylinder 61 is pressurized to release the cam-locking mechanism 56 from its frictionally engaged configuration.

The platform 14 and tread mechanism 16 enable the cask 30 to be transported over uneven ground and through buildings with minimum floor loading concentrations. The platform 14 comprises a substantially C-shaped structure as shown in FIG. 3. This shape of the platform 14 allows the cask transporter system 10 to be driven over and around the cask 30 for engagement therewith. Gussets 62 are provided to strengthen the corners of the platform 14. The gantry 12 is located midway along the platform 14 and is rigidly connected thereto as described hereinbefore. While various materials can be used for all of the components referred to herein, preferably steel or other durable materials are used.

The platform 14 is carried by the tread mechanism 16 as coupled thereto. The tread mechanism 16 comprises a left track 64 and a right track 66 mounted on guide rollers 68 and drive sprockets 70 in a conventional manner. The left track 64 and right track 66 are held in a desired spaced relationship by the platform 14 and its connections to the left track 64 and right track 66. The tread mechanism 16 provides substantial surface area over which the weight of the cask 30 being carried by the gantry 12 can be distributed, thereby minimizing floor loading concentrations.

The restraining system 24 is coupled to the gantry 12 to prevent the cask 30 from swinging and adversely affecting the stability of the cask transporter system 10. Though various types of restraining systems can be used, preferably a damped system comprising cushion hydraulic cylinders 72 coupled in a conventional manner to an accumulator 74 is used. This damped restraint enhances the stability of the cask transporter system 10, allowing quicker and safer braking.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A cask transporter for transporting nuclear waste casks, comprising:

a pair of substantially parallel, spaced treads;

a motor for powering said treads;

a platform carried by said treads defining an open-ended area between said treads for receiving a cask to be transported;

a pair of substantially vertical spaced extendable booms extending upwardly from said platform on opposite sides of said open-ended area;

a beam extending substantially horizontally across the upper ends of said extendable booms and raisable with said extendable booms;

one or more couplers carried on said beam for connecting said beam to a cask to be transported so that the cask is raised when said extendable booms are extended to raise said beam; and a restraint coupled to said platform and engageable with the cask for restraining the cask against swinging movement relative to said cask transporter when the cask is being transported by said cask transporter;

wherein each of said extendable booms is extended by means of applied hydraulic pressure and wherein each of said extendable booms includes an automatic brake responsive to the loss of applied hydraulic fluid pressure for locking each of said extendable booms against unintended retraction in the event of a loss of applied hydraulic fluid pressure.

2. A cask transporter as defined in claim 1 wherein each of said extendable booms includes a vertically oriented hydraulic cylinder.

3. A cask transporter as defined in claim 1 wherein said automatic brake includes a cam-locking mechanism that is spring-biased toward an engaged position and that is retained in a disengaged position by said hydraulic pressure applied to said hydraulic cylinders.

4. A cask transporter for transporting nuclear waste casks, comprising:

a pair of substantially parallel, spaced treads;

a motor or powering said treads;

a platform carried by said treads defining an open-ended area between said treads for receiving a cask to be transported;

a pair of substantially vertical spaced extendable booms extending upwardly from said platform on opposite sides of said open-ended area;

a beam extending substantially horizontally across the upper ends of said extendable booms and raisable with said extendable booms;

one or more couplers carried on said beam for connecting said beam to a cask to be transported so that the cask is raised when said extendable booms are extended to raise said beam;

a restraint coupled to said platform and engageable with the cask for retraining the cask against swinging movement relative to said cask transporter when the cask is being transported by said cask transporter;

wherein said restraint is damped to permit limited movement of the cask relative to said platform.

5. A cask transporter as defined in claim 4 wherein said restraint includes one or more cushion hydraulic cylinders coupled to an accumulator.

6. A system for transporting stored nuclear waste, said system comprising:

a pair of substantially parallel, spaced treads;

a motor for powering said treads;

a platform carried by said treads defining an open-ended area between said treads;

a substantially cylindrical, vertically oriented cask within said open-ended area for containing the nuclear waste, said cask having an upper end and a sidewall;

a pair of substantially vertical spaced extendable booms extending upwardly from said platform on opposite sides of said open-ended area;

a beam extending substantially horizontally across the upper ends of said extendable booms over said cask and raisable with said extendable booms;

one or more couplers carried on said beam for connecting said beam to said upper end of said cask so that said cask is raised when said extendable booms are extended to raise said beam; and a restraint coupled to said platform engaging said sidewall of said cask for retraining said cask against swinging movement while being transported;

wherein each of said extendable booms is extended by means of applied hydraulic pressure and wherein each of said extendable booms includes an automatic brake responsive to the loss of applied hydraulic fluid pressure for locking each of said extendable booms against unintended retraction in the event of a loss of applied hydraulic fluid pressure.

7. A system as defined in claim 6 wherein each of said extendable booms includes a vertically oriented hydraulic cylinder.

8. A system as defined in claim 6 wherein said automatic brake includes a cam-locking mechanism that is spring-biased toward an engaged position and that is retained in a disengaged position by said hydraulic pressure applied to said hydraulic cylinders.

9. A system for transporting stored nuclear waste, said systems comprising:

a pair of substantially parallel, spaced treads;

a motor for powering said treads;

a platform carried by said treads defining an open-ended area between said treads;

a substantially cylindrical, vertically oriented cask within said open-ended area for containing the nuclear waste, said cask having an upper end and a sidewall;

a pair of substantially vertical spaced extendable booms extending upwardly from said platform on opposite sides of said open-ended area;

a beam extending substantially horizontally across the upper ends of said extendable booms over said cask and raisable with said extendable booms;

one or more couplers carried on said beam for connecting said beam to said upper end of said cask so that said cask is raised when said extendable booms are extended to raise said beam; and a restraint coupled to said platform engaging said sidewall of said cask for restraining said cask against swinging movement while being transported;

wherein said restraint is damped to permit limited movement of said cask relative to said platform.

10. A cask transporter as defined in claim 9 wherein said restraint includes one or more cushion hydraulic cylinders coupled to an accumulator.

* * * * *